(12) United States Patent
Kanda et al.

(10) Patent No.: US 8,116,816 B2
(45) Date of Patent: Feb. 14, 2012

(54) RADIO COMMUNICATION APPARATUS, RADIO COMMUNICATION SYSTEM AND SIGNAL SWITCHING METHOD

(75) Inventors: Takashi Kanda, Kawasaki (JP); Jun Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 12/619,023

(22) Filed: Nov. 16, 2009

(65) Prior Publication Data

US 2010/0130147 A1 May 27, 2010

(30) Foreign Application Priority Data

Nov. 21, 2008 (JP) ................................ 2008-297680

(51) Int. Cl.
*H04B 1/38* (2006.01)
*H04K 3/00* (2006.01)
(52) U.S. Cl. .......................................... 455/561; 455/8
(58) Field of Classification Search .............. 455/8, 560, 455/561
See application file for complete search history.

(56) References Cited

U.S. PATENT DOCUMENTS

| 5,437,059 | A * | 7/1995 | Murakami et al. | 455/503 |
| 7,711,393 | B1 * | 5/2010 | Samson et al. | 455/560 |
| 2008/0089689 | A1 * | 4/2008 | Sakama | 398/115 |

OTHER PUBLICATIONS

Fujitsu Limited, "Radio Communication Apparatus, Radio Communication System and Radio Communication Method", U.S. Appl. No. 12/621,968, filed Nov. 19, 2009.
Ericsson AB, et al.: CPRI Specification V2.1 (Mar. 31, 2006); "Common Public Radio Interface (CPRI); Interface Specification", dated Mar. 31, 2006.

* cited by examiner

*Primary Examiner* — Lee Nguyen
(74) *Attorney, Agent, or Firm* — Myers Wolin, LLC.

(57) ABSTRACT

A radio communication system for conducting the radio communication with a terminal device includes a first radio communication apparatus for processing a first signal; a second radio communication apparatus for processing a second signal, and to combine the first signal and the second signal; a common amplifier for amplifying the first and second signals from the second radio communication apparatus, transmitting the amplified signals to the terminal device, amplifying first and second signals received from the terminal device, and outputting the amplified signals to the second radio communication apparatus, the second radio communication apparatus separating the amplified first and second signals; and a switching apparatus coupled to the first radio communication apparatus, the second radio communication apparatuses and the common amplifier to disconnect the first or second radio communication apparatus when a fault occurs in the first or second radio communication apparatus, respectively.

16 Claims, 19 Drawing Sheets

//<br>
RADIO COMMUNICATION APPARATUS, RADIO COMMUNICATION SYSTEM AND SIGNAL SWITCHING METHOD

CROSS-REFERENCE TO RELATED APPLICATIONS

This application is based upon and claims the benefit of priority of prior Japanese Patent Application No. 2008-297680, filed on Nov. 21, 2008, the entire contents of which are incorporated herein by reference.

FIELD

Certain aspects of the present invention discussed herein are related to a radio communication apparatus, radio communication system and signal switching method in the radio communication system.

BACKGROUND

FIG. 18 is a diagram illustrating an example of a configuration of a conventional radio base station apparatus (see CPRI Specification V2.1, for example). A radio base station apparatus 200 includes a radio equipment controller (REC) 210 for processing the baseband signal and a radio equipment (RE) 220 for processing the radio signal. The radio equipment controller 210 and the radio equipment 220 are connected to each other by an optical fiber 230. For this connection, an interface CPRI is used.

FIG. 19 is a diagram illustrating an example of a configuration of a conventional radio communication system using the CPRI (common public radio interface) as an interface (see PCT/JP2007/000565, for example). The radio communication system 100 includes a first radio base station apparatus 2, a second radio base station apparatus 4 and superordinate apparatuses 1, 3 connected to the radio base station apparatuses 2, 4, respectively. The first radio base station apparatus 2 and the second radio base station apparatus 4 are connected to each other through interface conversion units 213, 513 of radio equipment controllers 21, 51, respectively. The radio communication system 100 conducts radio communication with terminal devices through an antenna 5. The radio communication system 100 can provide two radio services A, B to the terminal devices.

The conventional radio communication system 100, however, harbors the problem that in the case where a fault occurs in the interface conversion unit 513, the signals from the second radio equipment controller 51 adapted for the radio service B and the signal from the first radio equipment controller 21 adapted for the radio service A cannot be output to a radio equipment 52. In such a case, the radio communication system 100 can not provide radio service A or B to the terminal devices continuously.

SUMMARY

Accordingly, in an aspect, an object of the invention is to provide a radio communication system, radio communication apparatus and radio communication system to contribute to continuous service providing.

According to a certain aspect of the invention, there is provided a radio communication system for conducting radio communication with a terminal device, including: a first radio communication apparatus for processing a first signal; a second radio communication apparatus for processing a second signal, and to combine the first signal and the second signal; a common amplifier for amplifying the first and second signals from the second radio communication apparatus, and transmitting the amplified signals to the terminal device; and a switching apparatus coupled to the first and second radio communication apparatus and the common amplifier to disconnect the first or second radio communication apparatus when a fault occurs in the first or second radio communication apparatus, respectively. This aspect may further include the common amplifier amplifying first and second signals received from the terminal device, outputting the amplified signals from the terminal device to the second radio communication apparatus, and the second radio communication apparatus separating the amplified first and second signals.

According to a certain aspect of the invention, there is provided a radio communication apparatus for conducting radio communication with a terminal device, including: a radio controller for combining a first signal with a second signal output from another radio communication apparatus and separating combined first and second signals received from a common amplifier; the common amplifier for amplifying and transmitting to the terminal device the first and second signals output from the radio controller on the one hand, and amplifying and outputting to the radio controller the combined first and second signals received from the terminal device on the other hand; and a switching unit coupled to the other radio communication apparatus and the radio controller and the common amplifier to disconnect the another radio base station apparatus or the radio controller when a fault occurs in the other radio base station apparatus or the radio controller, respectively.

According to a certain aspect of the invention, there is provided a signal switching method for a radio communication system including a first radio communication apparatus for processing a first signal, a second radio communication apparatus for processing a second signal, and to combine the first and second signals, and a common amplifier for amplifying and transmitting to a terminal device the first and second signals output from the second radio communication apparatus on the one hand and amplifying and outputting to the second radio communication apparatus the first and second signals received from the terminal device on the other hand, the second radio communication apparatus separating the first and second signals received from the common amplifier, wherein upon occurrence of a fault in the first or second radio communication apparatus, the first or second radio communication apparatus is disconnected by a switching apparatus coupled to the first and second radio communication apparatuses and the common amplifier.

It is to be understood that both the foregoing general description and the following detailed description are exemplary and explanatory and are not restrictive of the invention, as claimed.

DESCRIPTION OF EMBODIMENTS

The following embodiments are described with reference to the figures.

Figure 1:
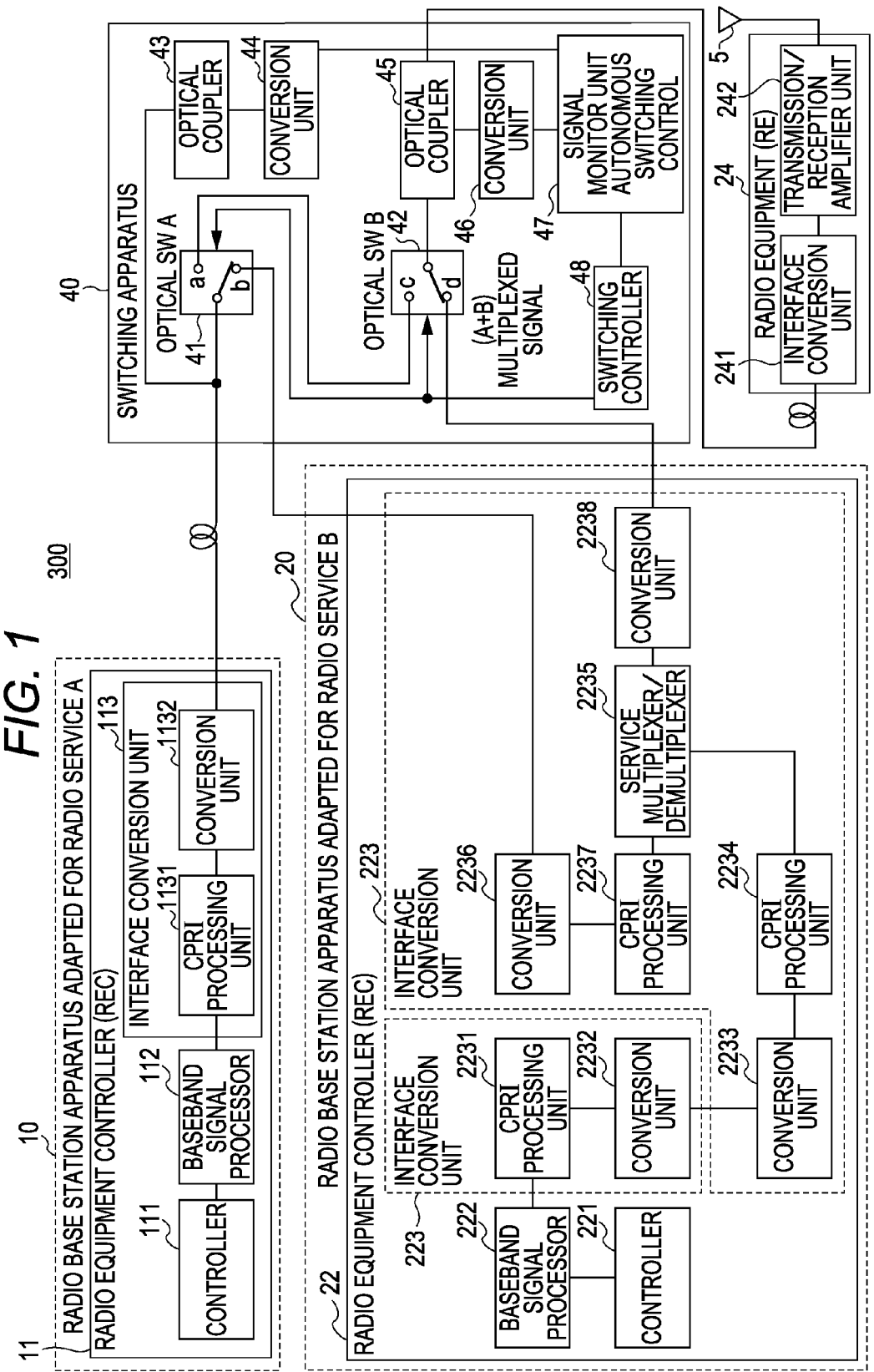
FIG. 1 illustrates a configuration example of a radio communication system.

FIG. 1 is a diagram illustrating an example of the configuration of a radio communication system 300. The radio communication system 300 includes a first radio base station apparatus (or a radio communication apparatus) 10 adapted for the radio service A, a second radio base station apparatus 20 adapted for the radio service B, a radio equipment (RE) 24 and a switching apparatus 40. The radio service A and the radio service B are different types of communication methods and the radio communication system 300 can handle the signals of the different types of communication methods. For example, the radio service A is a communication method for an old service, and the radio service B a communication method for a new service.

The first radio base station apparatus 10 includes a first radio equipment controller (REC) 11. The first radio equipment controller 11 includes a first controller 111, a first baseband signal processor 112 and a first interface conversion unit 113.

The second radio base station apparatus 20, on the other hand, includes a second radio equipment controller (REC) 22. The second radio equipment controller 22 includes a second controller 221, a second baseband signal processor 222 and a second interface conversion unit 223.

The first and second controllers 111, 221 control the interior of each radio base station apparatus 10, 20 by distributing a sync signal to each radio base station apparatus 10, 20 or set individual users.

First and second baseband signal processors 112, 222 convert the signal from a superordinate apparatus into, for example, a baseband signal having an I signal and a Q signal and also change the format of the baseband signal from the first and second interface conversion units 113, 223 into the one capable of transmission to the superordinate apparatus.

The first interface conversion unit 113 includes a first CPRI processing unit 1131 and a first conversion unit 1132.

The second interface conversion unit 223 includes a second CPRI processing unit 2231, a second conversion unit 2232, a third conversion unit 2233, a third CPRI processing unit 2234, a service multiplexer/demultiplexer 2235, a fourth conversion unit 2236, a fourth CPRI processing unit 2237 and a fifth conversion unit 2238.

The first and second CPRI processing units 1131, 2231 convert the baseband signal into the CPRI signal having the CPRI format and outputs the CPRI signal to the first and second conversion units 1132, 2232, respectively. Also, the first and second CPRI processing units 1131, 2231 convert the CPRI signal from the first and second conversion units 1132, 2232 into the baseband signal.

The first and second conversion units 1132, 2232 convert the CPRI signal from the first and second CPRI processing units 1132, 2232 into an optical signal, and by converting the optical signal into the CPRI signal, output the CPRI signal to the first and second CPRI processing units 1131, 2231.

The third and fourth conversion units 2233, 2236 convert the optical signal into the CPRI signal as an electrical signal, and outputs it to the third and fourth CPRI processing units 2234, 2237 on the one hand, and convert the CPRI signal from the third and fourth CPRI processing units 2234, 2237 into an optical signal on the other hand.

The third and fourth CPRI processing units 2234, 2237 convert the CPRI signal into the baseband signal, and output it to the service multiplexer/demultiplexer 2235 on the one hand, and convert the baseband signal from the service multiplexer/demultiplexer 2235 into the CPRI signal on the other hand.

The service multiplexer/demultiplexer 2235 multiplexes or synthesizes the two CPRI signals corresponding to two radio services A and B, respectively, and outputs by separating the multiplexed CPRI signal from the fifth conversion unit 2238 for each radio service.

The fifth conversion unit 2238 converts the multiplexed CPRI signal into an optical signal, and outputs the result to the switching apparatus 40. The optical signal from the switching apparatus 40 is converted into the CPRI signal and output to the service multiplexer/demultiplexer 2235.

The radio equipment 24 includes a third interface conversion unit 241 and a transmission/reception amplifier 242.

The third interface conversion unit 241 converts the optical signal from the switching apparatus 40 into the CPRI signal, and by separating or extracting the baseband signal corresponding to the radio services A and B from the converted CPRI signal (multiplexed signal), outputs the resulting signal to the transmission/reception amplifier 242. Also, the third interface conversion unit 241 multiplexes the baseband signal corresponding to the radio services A and B output from the transmission/reception amplifier 24, and by converting it into an optical signal, outputs the resulting signal to the switching apparatus 40.

The transmission/reception amplifier 242 modulates and amplifies the baseband signal from the third interface conversion unit 241, and outputs the resulting signal to the antenna 5. Also, the transmission/reception amplifier 242 amplifies the signal corresponding to the two radio services A and B received through the antenna 5, and outputs the resulting signal to the third interface conversion unit 241 by down conversion or the like.

As described above, the radio equipment 24 or the transmission/reception amplifier 242 is a common amplifier shared by the signals corresponding to the radio services A and B.

The antenna 5 transmits and receives, to/from the terminal device, the signals corresponding to the two radio services A and B. The radio communication system 300 can provide the two radio services A and B.

The switching apparatus 40 includes a first optical switch 41, a second optical switch 42, first and second optical couplers 43, 45, sixth and seventh conversion units 44, 46, a signal monitor/autonomous switching controller (hereinafter referred to as the signal monitor unit) 47 and a switching controller 48.

The first optical switch 41 is connected between the first conversion unit 1132 and the fourth conversion unit 2236, and further, between the first conversion unit 1132 and the second optical switch 42. The first optical switch 41, based on the switching control signal from the switching controller 48, outputs the signal adapted for the radio service A from the first conversion unit 1132 to one of the second optical switch 42 and the fourth conversion unit 2236 through the terminal "a" or "b", respectively. Also, the first optical switch 41, based on the switching control signal, outputs one of the signal from the second optical switch 42 and the signal from the fourth conversion unit 2236 to the first conversion unit 1132.

The first optical coupler 43 diverges (or copies) the signal flowing between the first radio base station apparatus 10 and the switching apparatus 40, and outputs the resulting signal to the sixth conversion unit 44. The sixth conversion unit 44 converts the diverged optical signal into an electrical signal and outputs it to the signal monitor unit 47.

The second optical switch 42 is connected between the fifth conversion unit 2238 and the radio equipment 24, and furthermore, between the first optical switch 41 and the radio equipment 24. The second optical switch 42, based on the switching control signal from the switching controller 48, outputs one of the signals adapted for the radio service A from the first optical switch 41 and the multiplexed signal from the fifth conversion unit 2238 to the radio equipment 24 through the terminal "c" or "d." Also, the second optical switch 42, based on the switching control signal, outputs the signal from the radio equipment 24 to the fifth conversion unit 2238 or the first optical switch 41.

The second optical coupler 45 is connected between the second optical switch 42 and the radio equipment 24 and diverges (or copies) the signal flowing therebetween. The seventh conversion unit 46 converts an optical signal into an electrical signal, and outputs the resulting signal to the signal monitor unit 47.

The signal monitor unit 47, based on the signal from the sixth or seventh conversion unit 44, 46, detects whether a fault has occurred in the first radio base station apparatus 10 or the second radio equipment controller 22, and notifies the result to the switching controller 48.

The switching controller 48, based on the notification from the signal monitor unit 47, outputs a switching control signal to the first and second optical switches 41, 42.

Figure 2:
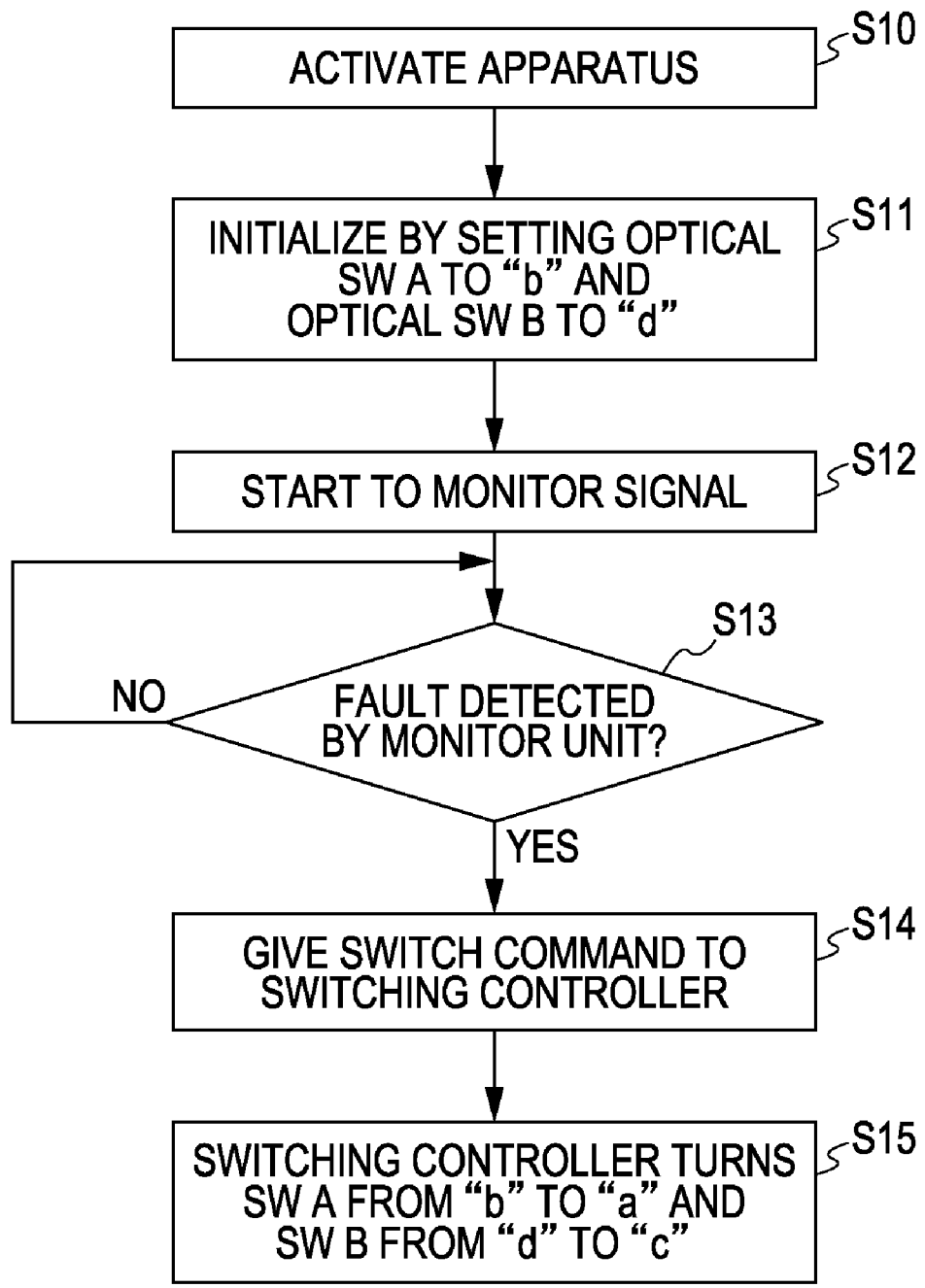
FIG. 2 is a flowchart illustrating an example of switching control.

Next, the switching operation of the first and second optical switches 41, 42 is illustrated. First, the down direction (the direction from each radio base station apparatus 10, 20 to the radio equipment 24) is illustrated. FIG. 2 is a flowchart illustrating an example of the switching operation.

The switching apparatus 40, once activated (S10), is initialized (S11). The switching controller 48, upon detection of the activation of the switching apparatus 40, outputs a switching control signal to switch the first optical switch 41 to the terminal "b" and the second optical switch 42 to the terminal "d" as an initialize operation. The first and second optical switches 41, 42 are operated based on the switching control signal. FIG. 1 illustrates an example of the switching operation for initialization.

In this case, the signal for the radio service A output from the first radio base station apparatus 10 is output to the second radio base station apparatus 20 adapted for the radio service B through the first optical switch 41. Also, the two multiplexed signals for the radio services A and B are output to the radio equipment 24 through the second optical switch 42 from the second radio base station apparatus 20. In this case, the two signals of the radio services A, B are transmitted from the antenna 5, and therefore, the radio communication system 300 can provide the two radio services A, B to the terminal device.

Then, the signal monitor unit 47 of the switching apparatus 40 starts to monitor the multiplexed signal output from the second optical switch 42 (S12).

The signal monitor unit 47, upon detection of a fault in the signal output from the second optical switch 42 (YES in S13), notifies the switching controller 48 that a fault has been detected (S14).

The switching controller 48, upon reception of this notice, outputs a switching control signal to the switches 41, 42 to switch the first optical switch 41 from terminal "b" to terminal "a" and the second optical switch 42 from terminal "d" to terminal "c".

Figure 3:
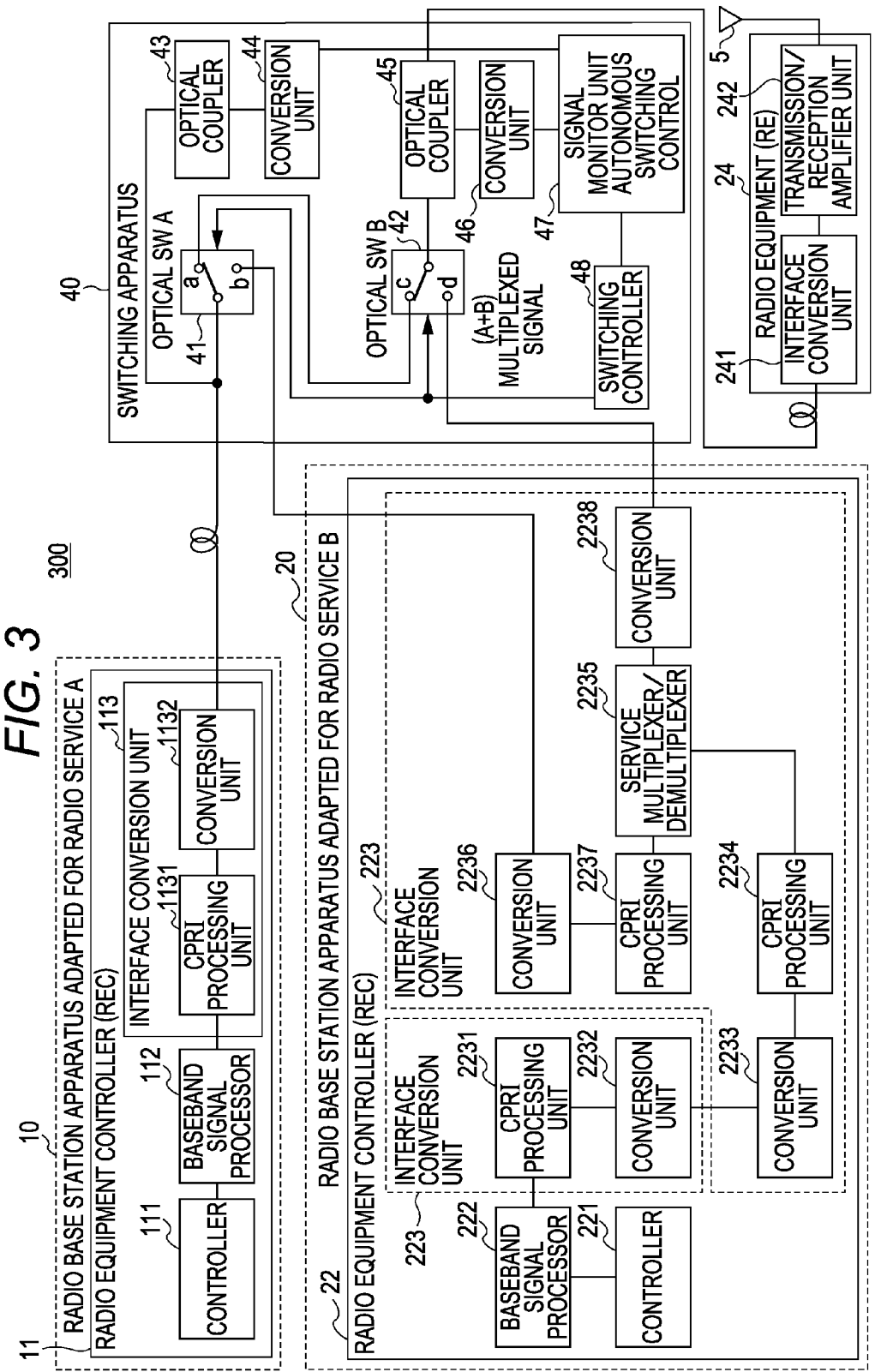
FIG. 3 illustrates another configuration example of a radio communication system.

FIG. 3 is a diagram illustrating an example of the configuration of the radio communication system 300 after the switching operation. After the switching operation, the signal adapted for the radio service A is output from the first optical switch 41 to the second optical switch 42, and further, from the second optical switch 42 to the radio equipment 24. The signal adapted for the radio service A is not output to the second radio base station apparatus 20, and the output signal from the second radio base station apparatus 20 is not output to the radio equipment 24. By the switching operation, the second radio base station apparatus 20 is separated from the radio communication system 300, and the signal adapted for the radio service A is output to the radio equipment 24 without being affected by the second radio base station apparatus 20 adapted for the radio service B.

Returning to FIG. 2, the signal monitor unit 47, as far as no fault is detected (NO in step S13), repeats the process until a fault is detected (loop of S13).

As described above, the radio communication system 300, upon detection of a fault of the signal output from the second radio base station apparatus 20, outputs a signal adapted for the radio service A through the switching apparatus 40. The radio communication system 300, therefore, can continue to provide the service even after a fault occurs in the second radio equipment controller 22 adapted for the radio service B.

Figure 4:
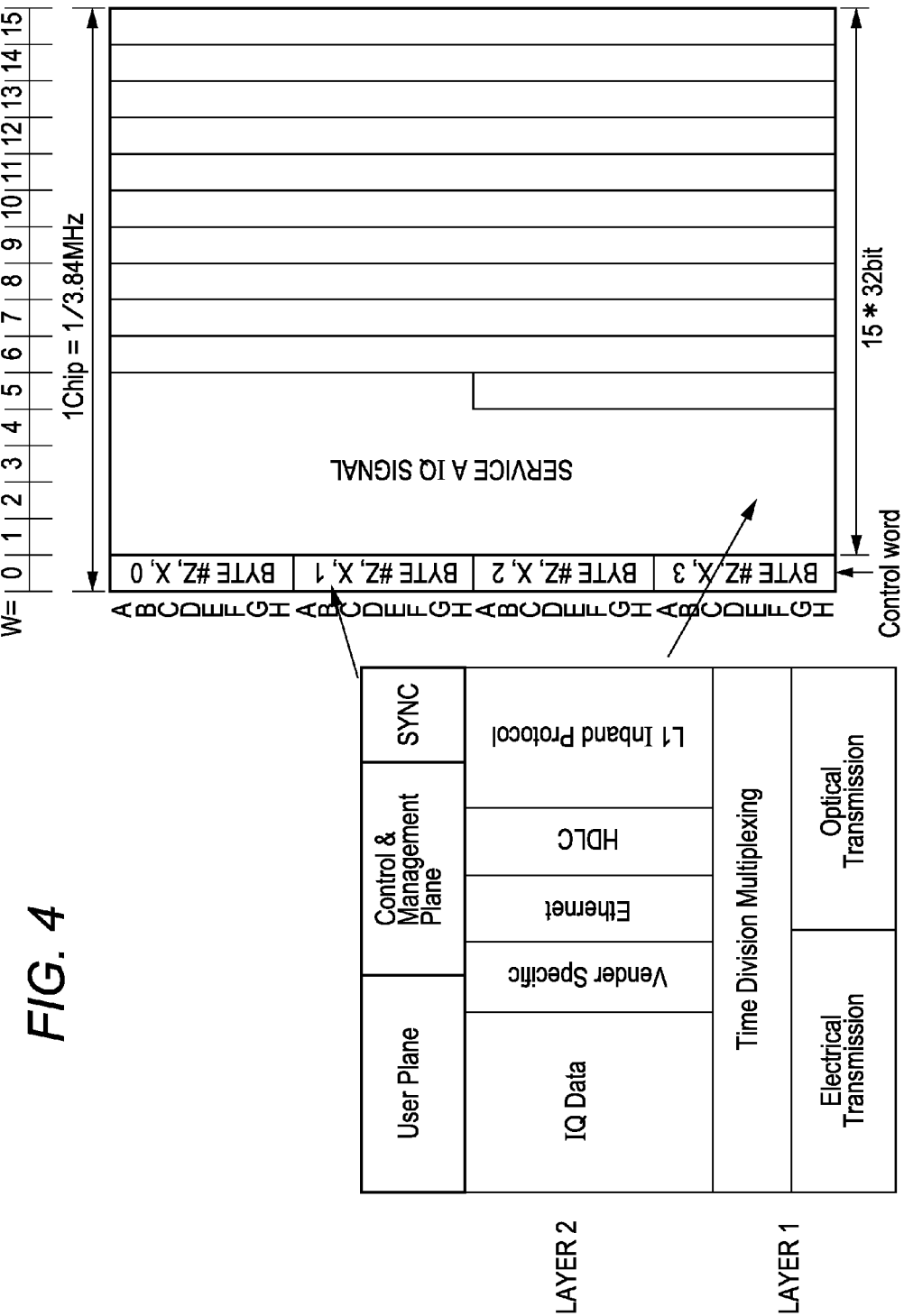
FIG. 4 illustrates an example of CPRI protocol.

Next, an example of fault detection is illustrated. FIG. 4 is a diagram illustrating an example of the CPRI protocol. In the layer 1 of the CPRI protocol, the disconnection of an optical interface can be detected by removing a connector, for example. By receiving this signal indicating the disconnection, the signal monitor unit 47 can detect a fault. As another method, the signal monitor unit 47 can detect a fault taking advantage of, for example, High-Level Data Link Control (HDLC) of the layer 2. In the case of "HDLC", the information indicating a link disconnection or a protocol fault, if developed, is inserted in the "HDLC" field, and therefore, is detected by the signal monitor unit 47. Further, the signal monitor unit 47 can detect a fault by monitoring the diagnosis data or the data unique to each vendor using "Vender Specific" or "Control & Management Plane" and detecting the data indicating a fault. The information is inserted in each field by, for example, the service multiplexer/demultiplexer 2235 or the fifth conversion unit 2238.

The aforementioned case represents an example in which a fault is detected by the signal monitor unit 47. In this case, the signal monitor unit 47 can detect a fault up to the stage before the second optical switch 42 from the service multiplexer/demultiplexer 2235 of the second radio equipment controller 22.

Figure 5:
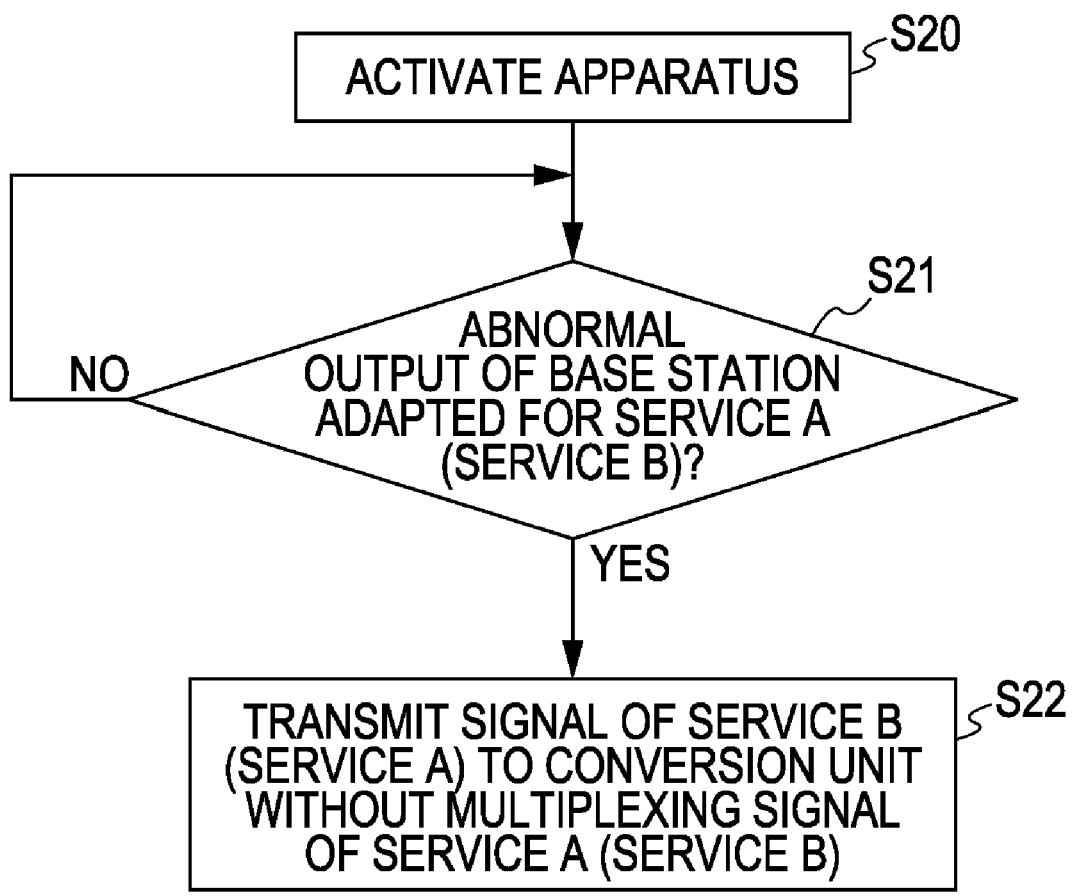
FIG. 5 illustrates an operation example when an abnormality is detected.

A fault which occurs in the range from the second controller 221 and the fourth conversion unit 2236 up to the stage before the service multiplexer/demultiplexer 2235 in the second radio base station apparatus 20, on the other hand, can be detected by, for example, the service multiplexer/demultiplexer 2235. The service multiplexer/demultiplexer 2235 handles the CPRI signal, and therefore, can detect a fault in the example illustrated in FIG. 4. The operation performed upon detection of a fault in such a case is illustrated. FIG. 5 is a flowchart illustrating an example of such an operation.

The service multiplexer/demultiplexer 2235, upon detection of a fault in the signal on the radio service A side, i.e. the signal input/output in the range from the fourth conversion unit 2236 up to the fourth CPRI processing unit 2237 (YES in S20, S21), outputs a signal for the radio service B side without multiplexing the signal for the radio service A side (S22).

In the case where the service multiplexer/demultiplexer 2235 detects a fault in the signal on the radio service B side, i.e. the signal input or output in the range from the second controller 221 up to the third CPRI processing unit 2234 (YES in S21), on the other hand, the signal on the radio service B side is not multiplexed but the signal on the radio service A side is output (S22).

In the case where a fault is detected in the service multiplexer/demultiplexer 2235, the switching apparatus 40 is kept in the initialized state. In the case where no fault is detected or cannot be detected in the service multiplexer/demultiplexer 2235, however, a fault may be detected by the signal monitor unit 47 of the switching apparatus 40 described above.

The switching apparatus 40 can also monitor a fault of the first radio base station apparatus 10. The signal monitor unit 47 monitors the signal applied through the first optical coupler 43 and the sixth conversion unit 44, and performs the switching operation as illustrated in FIG. 1 for initialization. The signal monitor unit 47, upon detection of a fault, notifies the switching controller 48. The switching controller 48 outputs a switching control signal in such a manner that the first optical switch 41 is turned to the terminal "a" and the second optical switch turned to the terminal "d."

Figure 6:
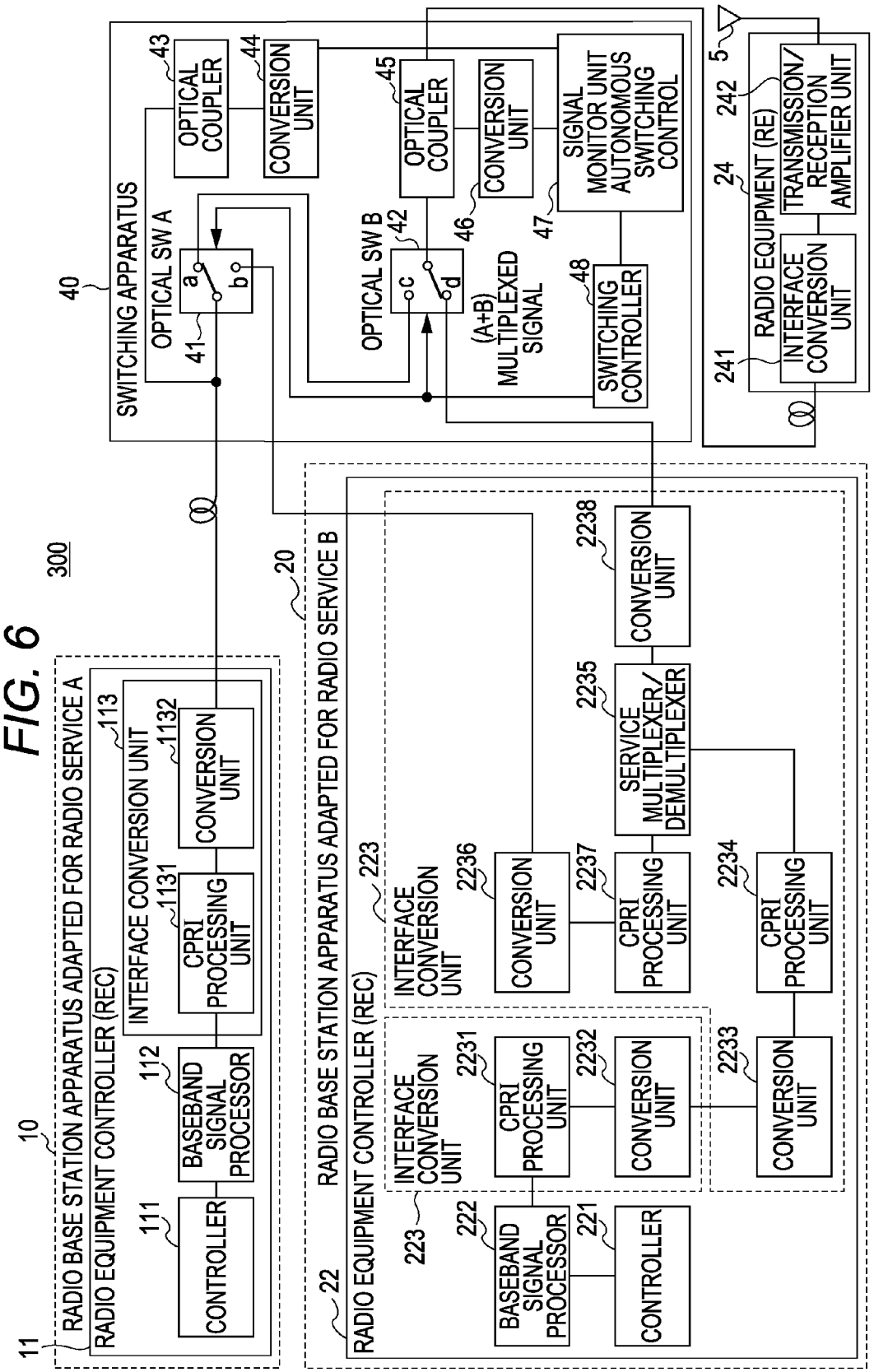
FIG. 6 illustrates another configuration example of a radio communication system.

FIG. 6 is a diagram illustrating an example of the configuration of the radio communication system 300 after switching. The signal adapted for the radio service A is output to the second optical switch 42 through the first optical switch 41. Since the second optical switch 42 is switched to terminal "d," however, the signal adapted for the radio service A is not output from the second optical switch 42. Also, the signal adapted for the radio service A is not transmitted to the second radio base station apparatus 20. As a result, the signal adapted for the radio service B is output from the second optical switch 42 to the radio equipment 24.

In the case where the switching apparatus 40 detects a fault in the signal from the first radio base station apparatus 10, the signal from the second radio base station apparatus 20 is output to the radio equipment 24. Thus, the radio communication system 300 can continuously provide the services.

Figure 7:
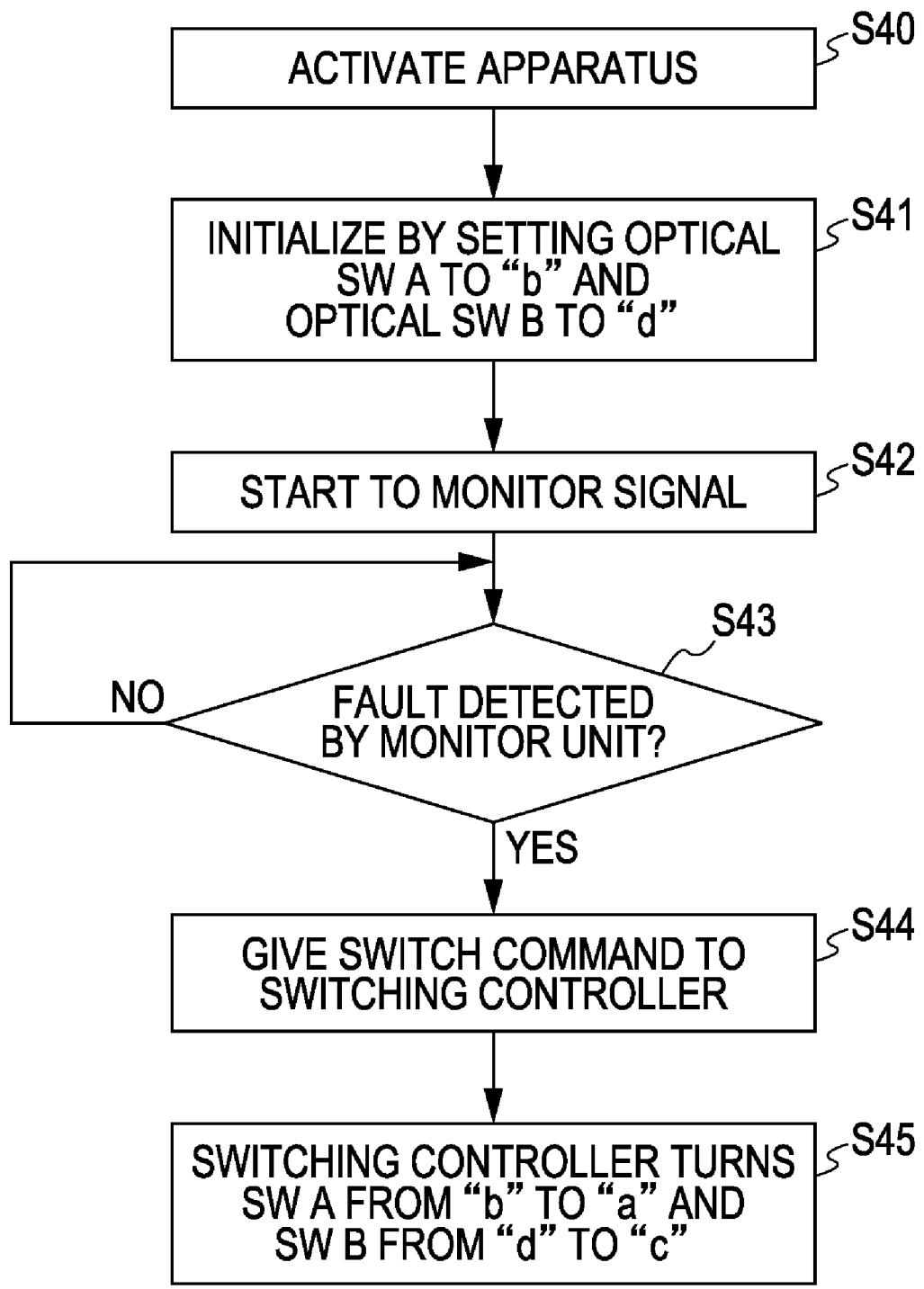
FIG. 7 is a flowchart illustrating a example of switching control.

Next, the operation in the up direction is illustrated. FIG. 7 is a flowchart illustrating an example of the switching operation in the up direction.

The switching apparatus 40, once activated (S40), is initialized (S41). For example, the switching controller 48, upon detection of the activation of the switching apparatus 40, outputs a switching control signal in such a manner as to turn the first optical switch 41 to terminal "b" and the second optical switch 42 to terminal "d." The In this case, the signal from the radio equipment 24 is output to the second radio control apparatus 22 through the second optical switch 42. Also, the signal adapted for the radio service A output from the second radio base station apparatus 20 is output to the first radio base station apparatus 10 through the first optical switch 41.

Then, the signal monitor unit 47 of the switching apparatus 40 starts to monitor the signal output from the first optical switch 41, i.e. the signal output from the first optical coupler 43 and the sixth conversion unit 44 (S42).

The signal monitor unit 47, upon detection of a fault in the signal output from the first optical switch 41 (YES in S43), notifies the switching controller 48 that a fault is detected (S44).

The switching controller 48, in response to this notice, outputs a switching control signal to the switches 41, 42 in such a manner as to turn the first optical switch 41 to terminal "a" and the second optical switch 42 to terminal "c." An example of the configuration after the switching operation is illustrated in FIG. 3.

The signal from the radio equipment 24 is output to the first radio base station apparatus 10 from the second optical switch 42 through the first optical switch 41. The second radio equipment controller 22 adapted for the radio service B and the radio equipment 24 is disconnected by the two switches 41, 42. Even in the case where a fault occurs in the second radio equipment controller 22, the signal from the radio equipment 24 can be output to the first radio base station apparatus 10. As a result, the radio communication system 300 can continuously provide the service to the terminal device also in the up direction.

Returning to FIG. 7, in the case where no fault is detected in the signal from the sixth conversion unit 44 (NO in S43), the signal monitor unit 47 repeats the process until a fault is detected (loop of S43).

Figure 8:
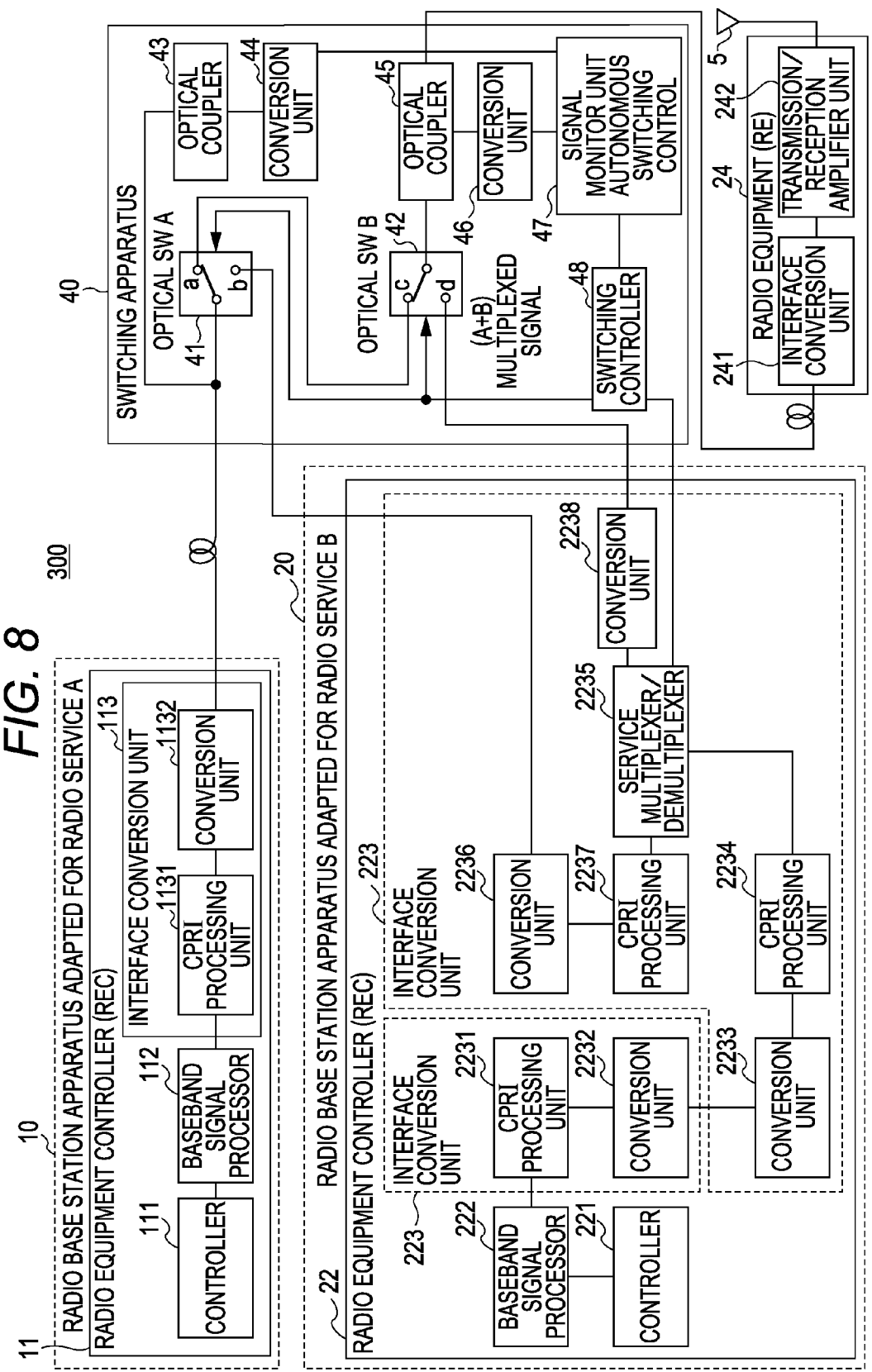
FIG. 8 illustrates still another configuration example of a radio communication system.

Incidentally, in the case where a fault occurs due to trouble between the service multiplexer/demultiplexer 2235 and the fourth conversion unit 2236 of the second radio equipment controller 22, the signal monitor unit 47 can detect the fault by monitoring the output of the first optical switch 41. Also, a fault, if developed in the stages before the service multiplexer/demultiplexer 2235 of the second radio equipment controller 22, can be detected by the service multiplexer/demultiplexer 2235. In this case, the service multiplexer/demultiplexer 2235 and the switching controller 48 may be connected to each other with a control line, for example, in order that the service multiplexer/demultiplexer 2235 may notify the detected fault occurrence to the switching apparatus 40. An example of such a configuration is illustrated in FIG. 8. The switching controller 48, upon reception of the notice on the fault occurrence, performs the switching operation in such a manner as to disconnect the second radio equipment controller 22 as illustrated in FIG. 8.

Figure 9:
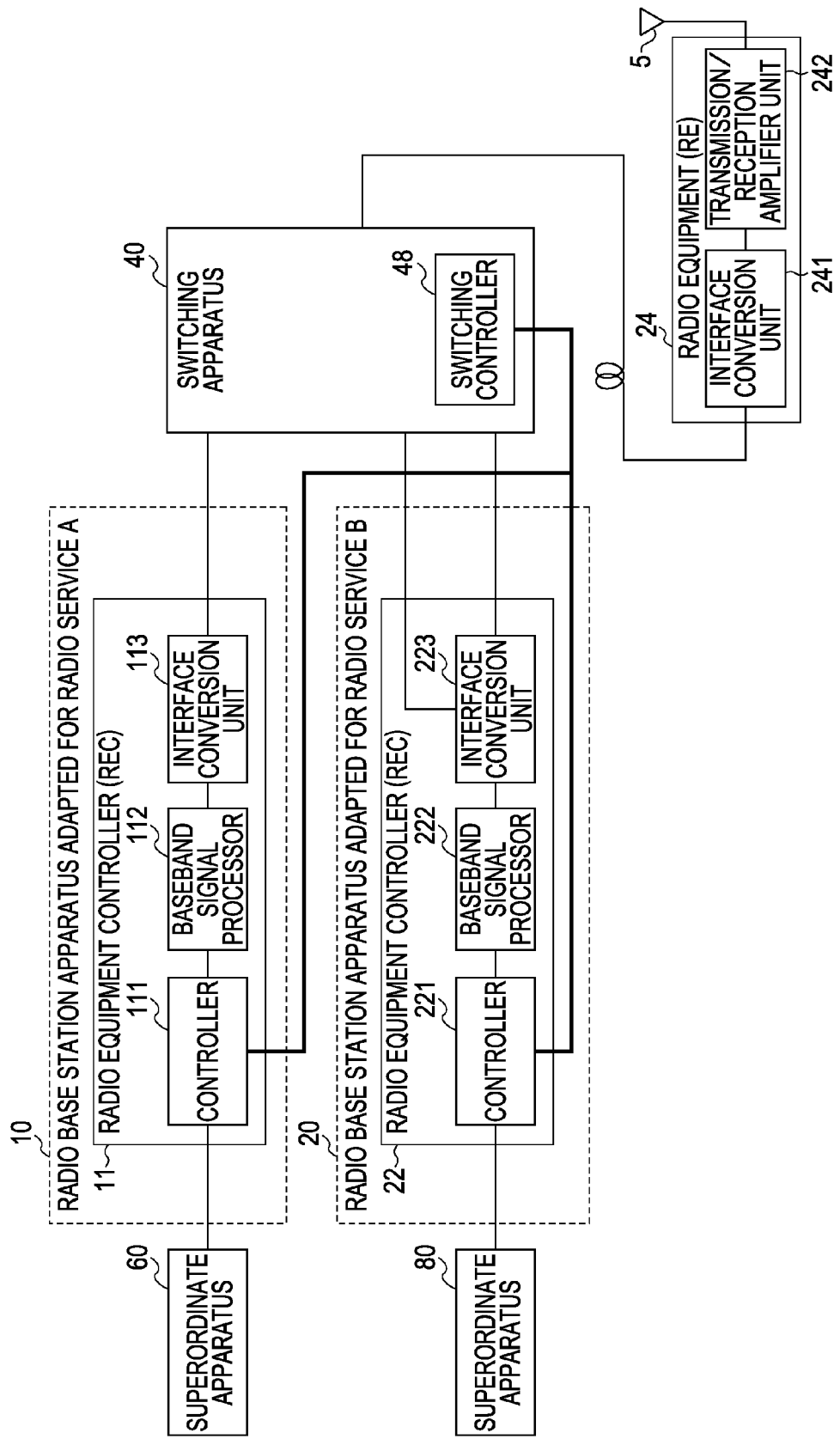
FIG. 9 is a flowchart illustrating an example of switching control.
Figure 10:
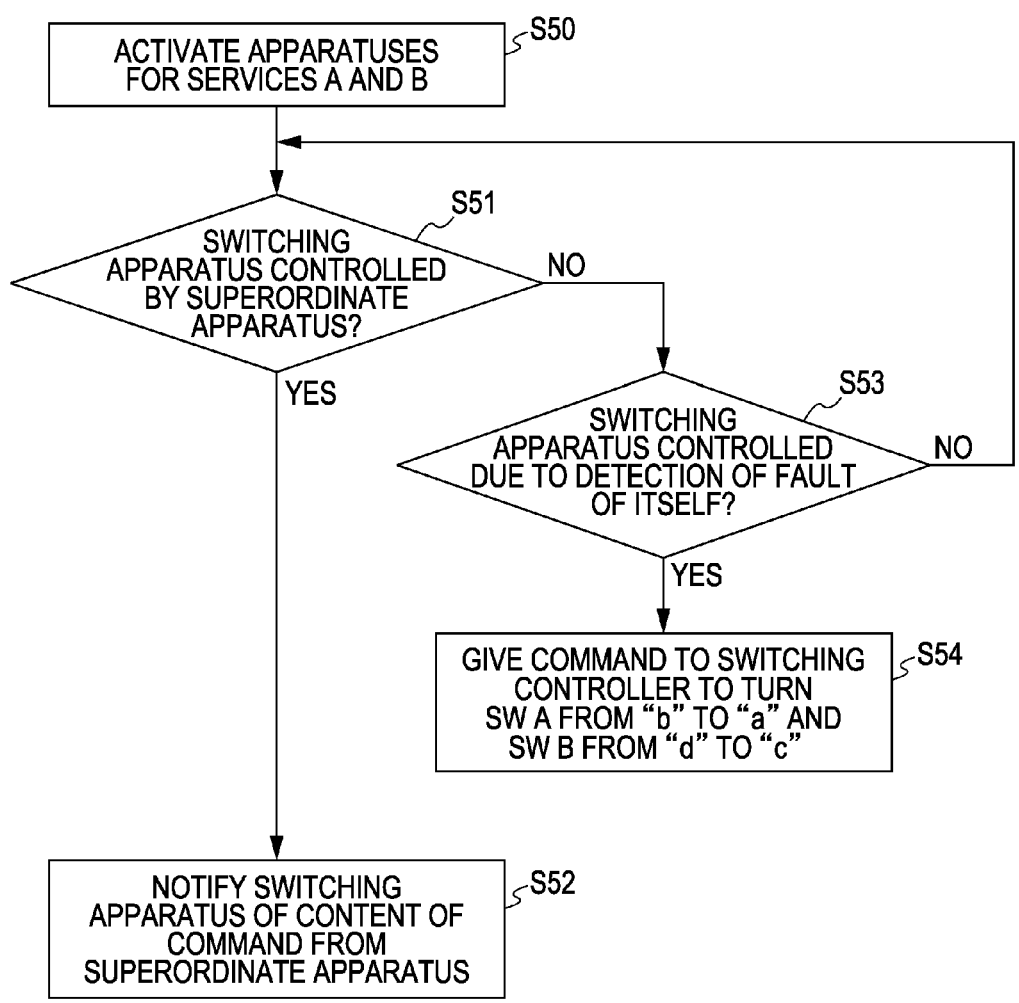
FIG. 10 is a flowchart illustrating an example of switching control.
Figure 11:
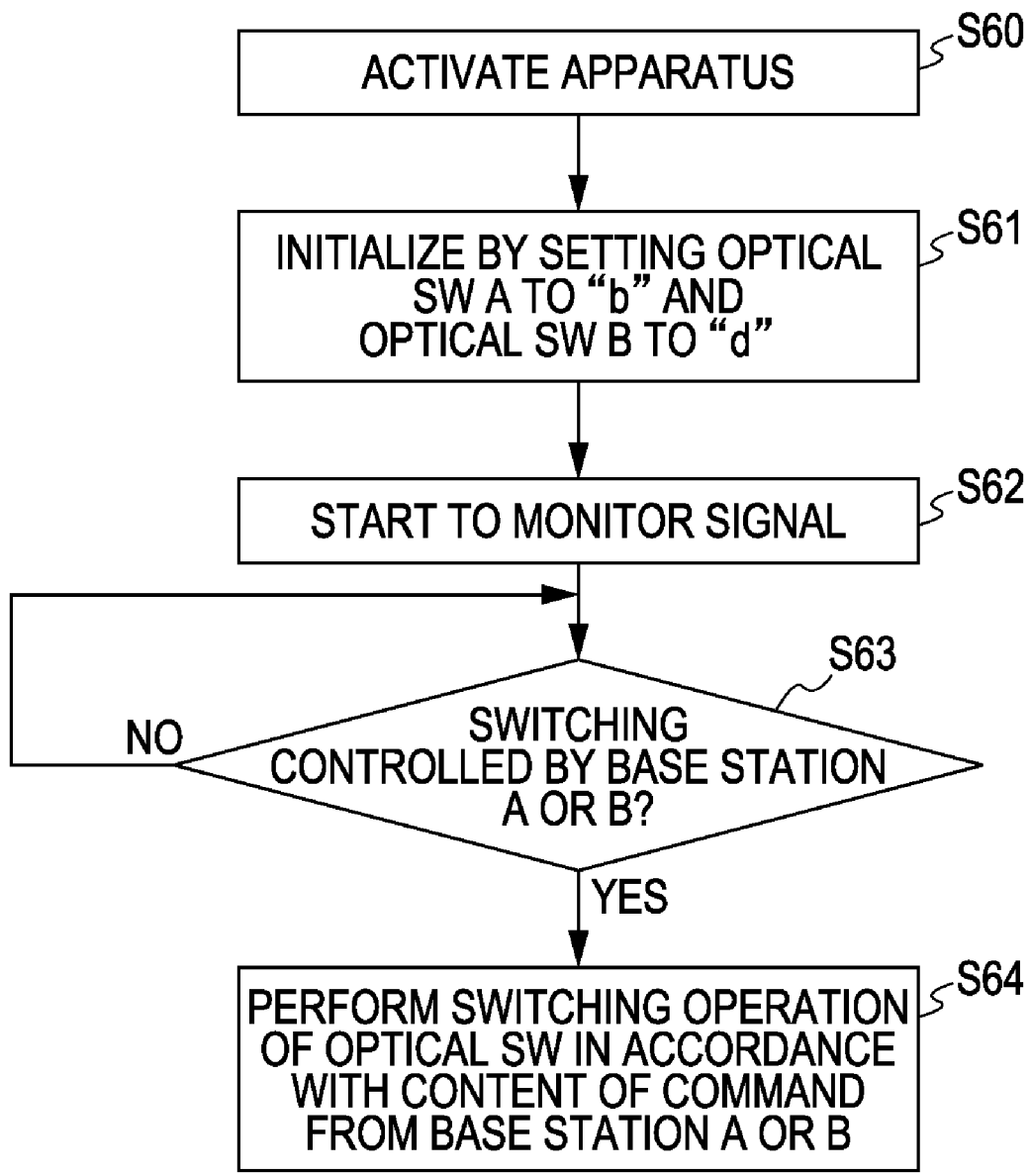
FIG. 11 illustrates yet another configuration example of a radio communication system.

Next, another embodiment is illustrated. For example, the switching apparatus 40 may be operated based on a command from a superordinate apparatus. FIGS. 9 to 11 are diagrams illustrating an example of the configuration of the radio communication system 300 in such a case.

As illustrated in FIG. 9, the radio communication system 300 further includes first and second superordinate apparatuses 60, 80. The first superordinate apparatus 60 is connected to the first radio base station apparatus 10 adapted for the radio service A, and the second superordinate apparatus 80 to the second radio base station apparatus 20 adapted for the radio service B. Further, the first and second controllers 111, 221 are each connected to the switching controller 48 of the switching apparatus 40, respectively, by a control line.

FIG. 10 is a flowchart illustrating an example of the switching operation in the first and second controllers 111, 221. The flowchart of FIG. 10 includes the process both up and down directions.

Upon activation of the first and second radio base station apparatuses 10, 20 adapted for the radio services A, B (S50), the first or second controller 111, 221 judges whether a control signal is received by the switching apparatus 40 from the first or second superordinate apparatus 60, 80 (S51).

The first or second controller 111, 221, upon reception of the control signal (YES in S51), gives a switch command contained in the control signal to the switching controller 48 through the control line (S52). As a result, the switching apparatus 40 performs the switching operation under the control of the first or second superordinate apparatus 60, 80. As illustrated in FIG. 3 or 6, for example, the switching operation is performed in such a manner that the signal from the first or second radio equipment controller 11, 22 is output to the radio equipment 24. As an example, this switching operation is performed for maintenance or to trace the cause of a fault.

The first or second controller 111, 221, upon reception of no control signal (NO in S51), on the other hand, judges whether the switching apparatus 40 is controlled due to a fault of the local apparatus (S53). The first and second controllers 111, 221, for example, can detect a signal indicating a fault in the case where a fault occurs in the first or second radio base station apparatus 10, 20. This process can be judged from whether this signal is received or not.

In the case where the switching apparatus 40 is controlled due to a fault of the local apparatus (YES in S53), the first or second controller 111, 221 instructs the switching controller 48 to perform the switching operation (S54). The switching controller 48 is instructed to perform the switching operation in such a manner that upon detection of a fault in the second radio base station apparatus 20 by the second controller 221, for example, the first optical switch 41 is turned to terminal "a" and the second optical switch 42 to terminal "c." As a result, as illustrated in FIG. 3, for example, the second radio equipment controller 22 adapted for the radio service B can be separated from the radio communication system 300.

FIG. 11 is a flowchart illustrating an example of the switching operation of the switching apparatus 40. The flowchart of FIG. 11 also includes the process in both up and down directions.

The switching apparatus 40 is initialized (S61) by the activation thereof (S60). For example, the switching apparatus 40 turns the first optical switch 41 to terminal "b" and the second optical switch to terminal "d."

Then, the signal monitor unit 47 and the switching controller 48 monitors the signal (S62).

Next, the switching controller 48, upon reception of a switching command from the first or second controller 111, 221 of the first or second radio base station apparatus 10, 20 (YES in S63), outputs a switching control signal to the first and second optical switches 41, 42 in accordance with the content of the command (S64). As a result, the switching operation is performed as illustrated in FIGS. 3 and 6.

On the other hand, in the case where no switch command is received from the first and second controllers 111, 221 (NO in S63), the aforementioned process is repeated until such command is received.

Figure 12:
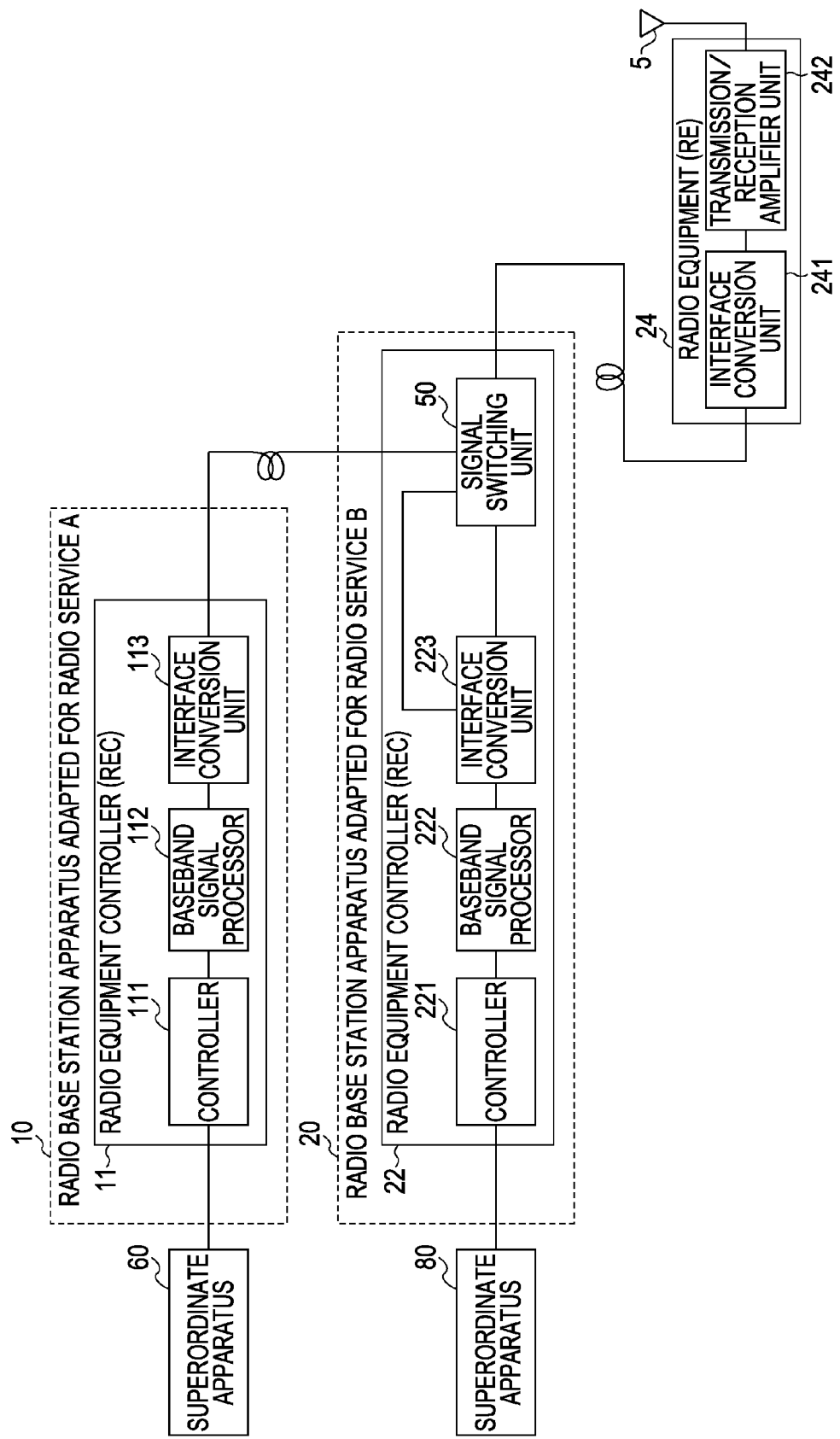
FIG. 12 illustrates a configuration example of the second interface converging unit and the signal switching unit.
Figure 13:
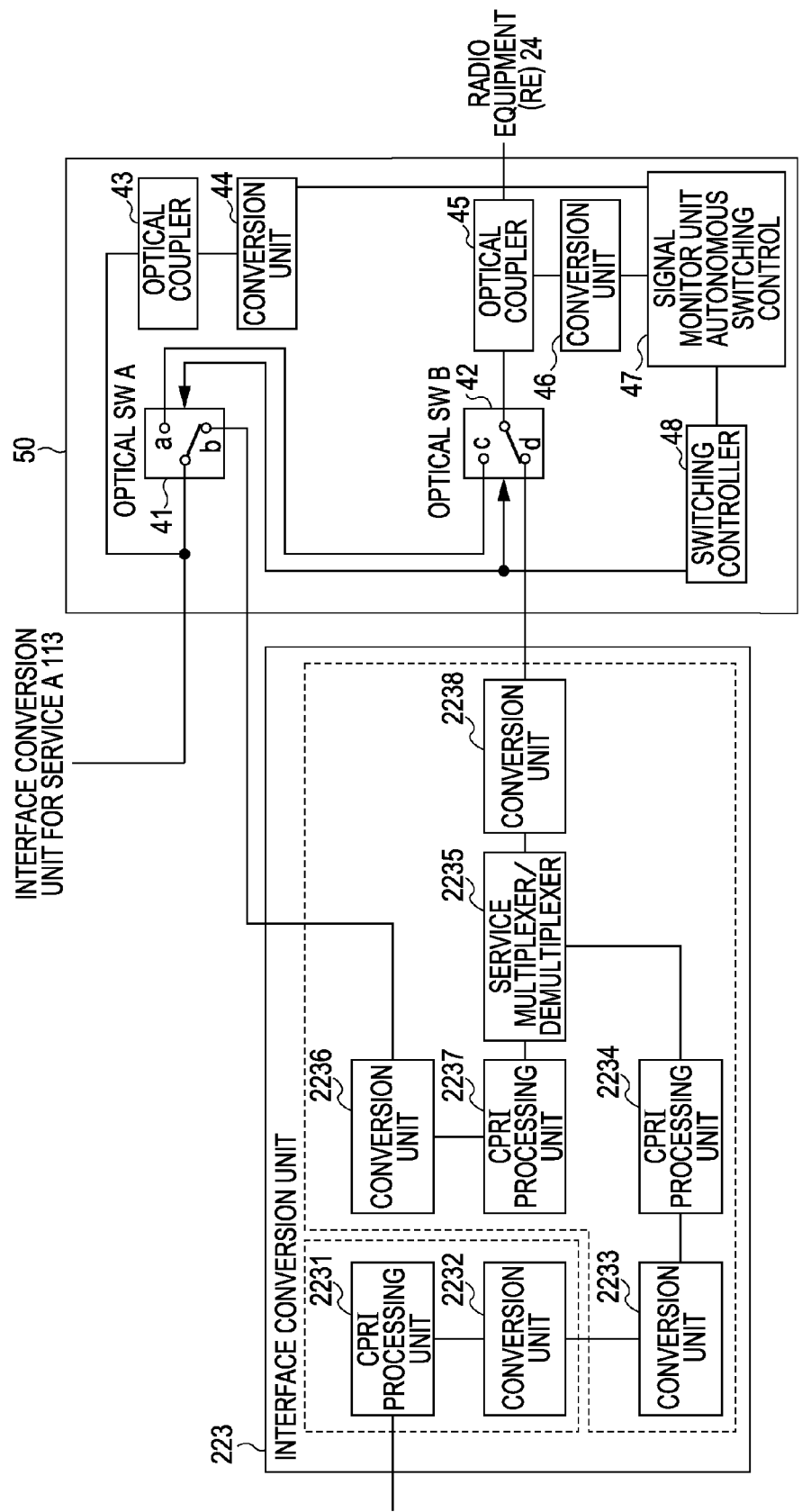
FIG. 13 illustrates yet another configuration example of a radio communication system.

As another embodiment, the switching apparatus 40 may be arranged not outside but inside of the second radio base station apparatus 20. FIGS. 12 and 13 are diagrams illustrating an example of such a configuration of the radio communication system 300. The second radio base station apparatus 20 includes a signal switching unit 50. As illustrated in FIG. 12, the signal switching unit 50 has the same configuration as the switching apparatus 40 described above.

Figure 14:
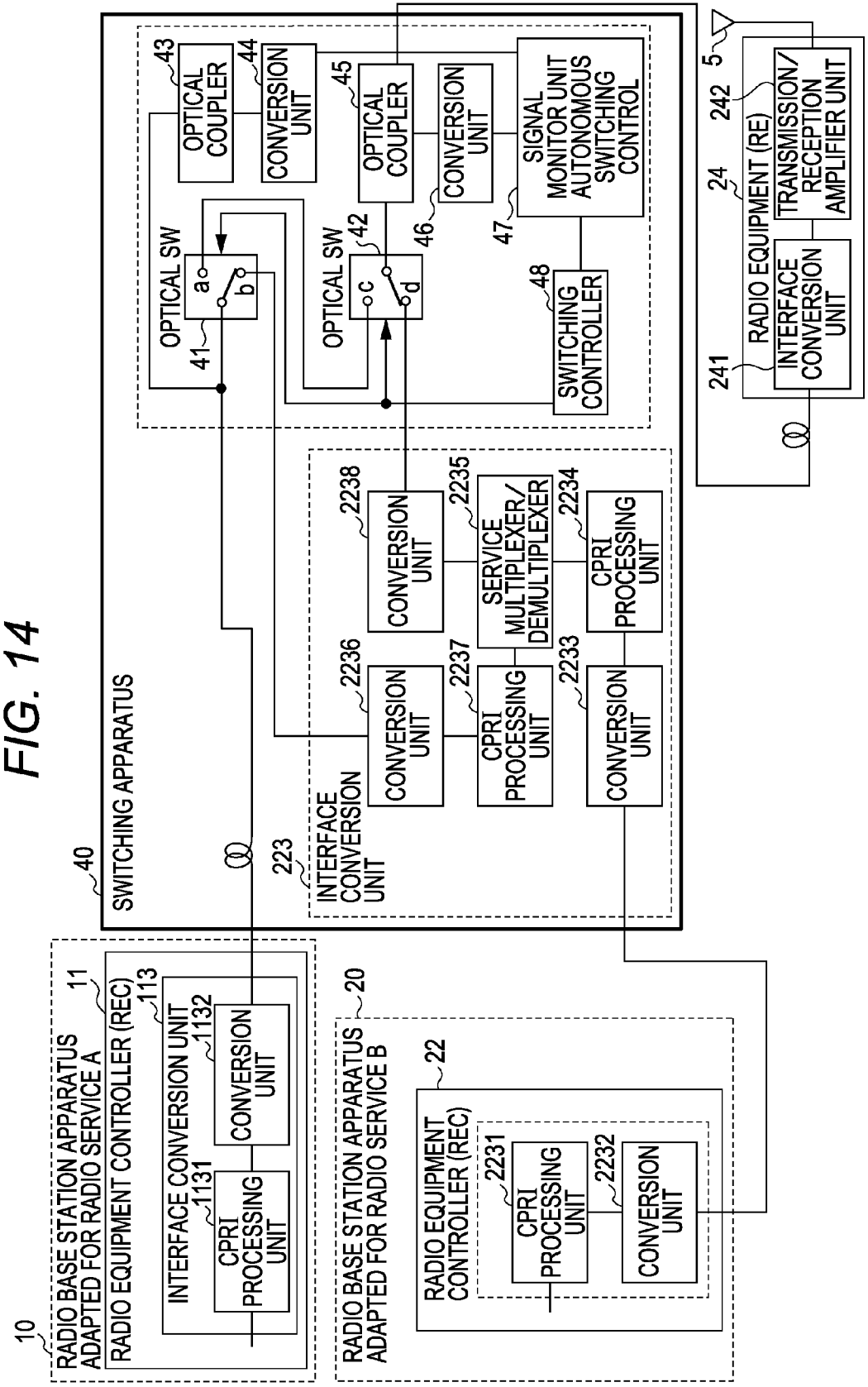
FIG. 14 illustrates yet another configuration example of a radio communication system.
Figure 15:
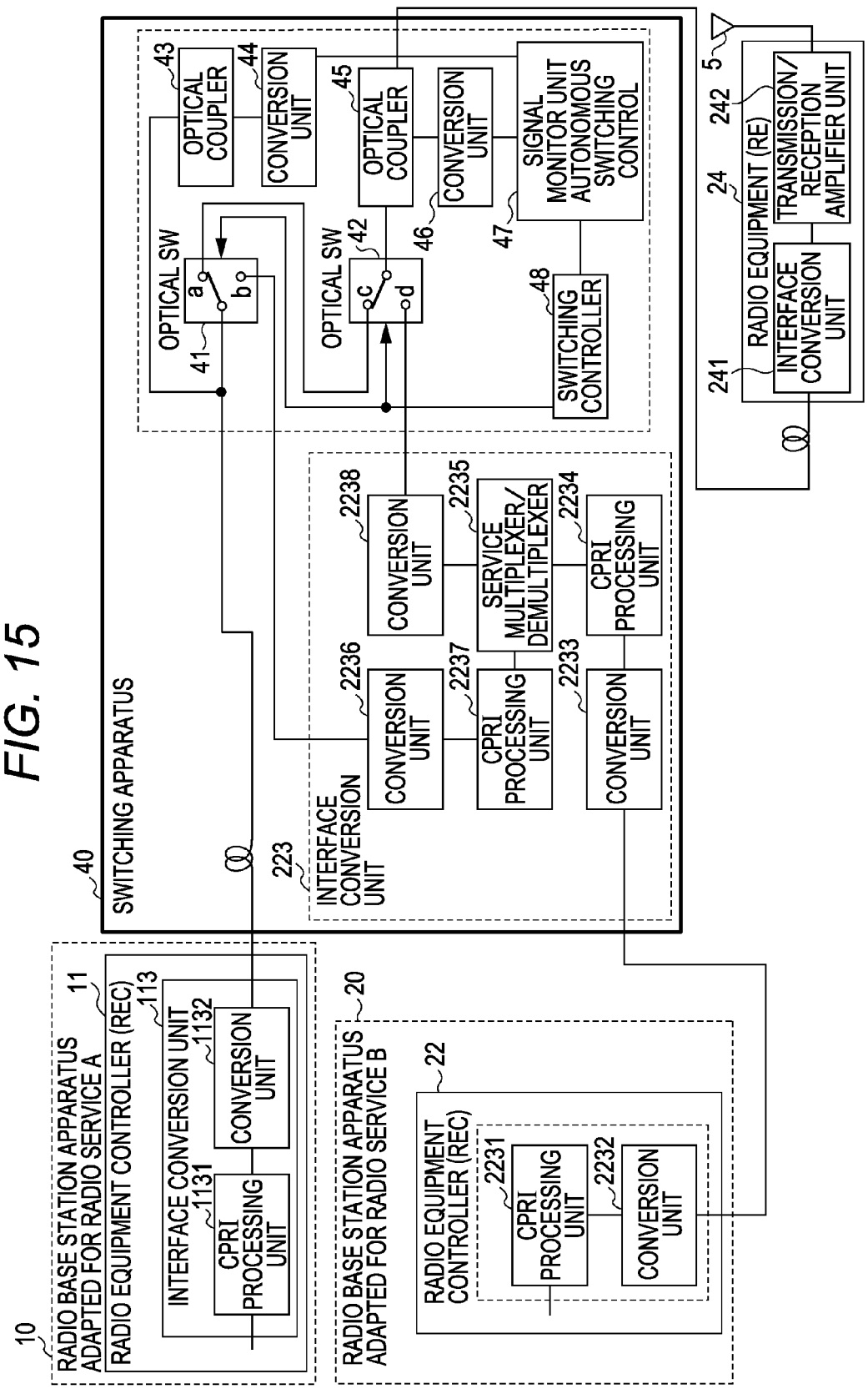
FIG. 15 illustrates yet another configuration example of a radio communication system.

As still another embodiment, the second interface unit 223 of the second radio base station apparatus 20 may be arranged inside the switching apparatus 40. FIGS. 14 and 15 illustrate an example of such a configuration of the radio communication system 300. The switching apparatus 40 further includes a second interface conversion unit 223.

In normal operation, the first and second optical switches 41, 42, as illustrated in FIG. 14, are turned to terminals "b" and "d," respectively. On the other hand, in the case where a fault occurs in the second radio equipment controller 22 or the second interface conversion unit 223, as illustrated in FIG. 15, the first and second optical switches 41, 42 are turned to terminals "a" and "c," respectively. Also in the case where a fault occurs in the first radio base station apparatus 10, as illustrated in FIG. 6, the first and second optical switches 41, 42 are turned to terminals "a" and "c," respectively. Also in this case, the radio services can be provided continuously even if a fault occurs.

Figure 16:
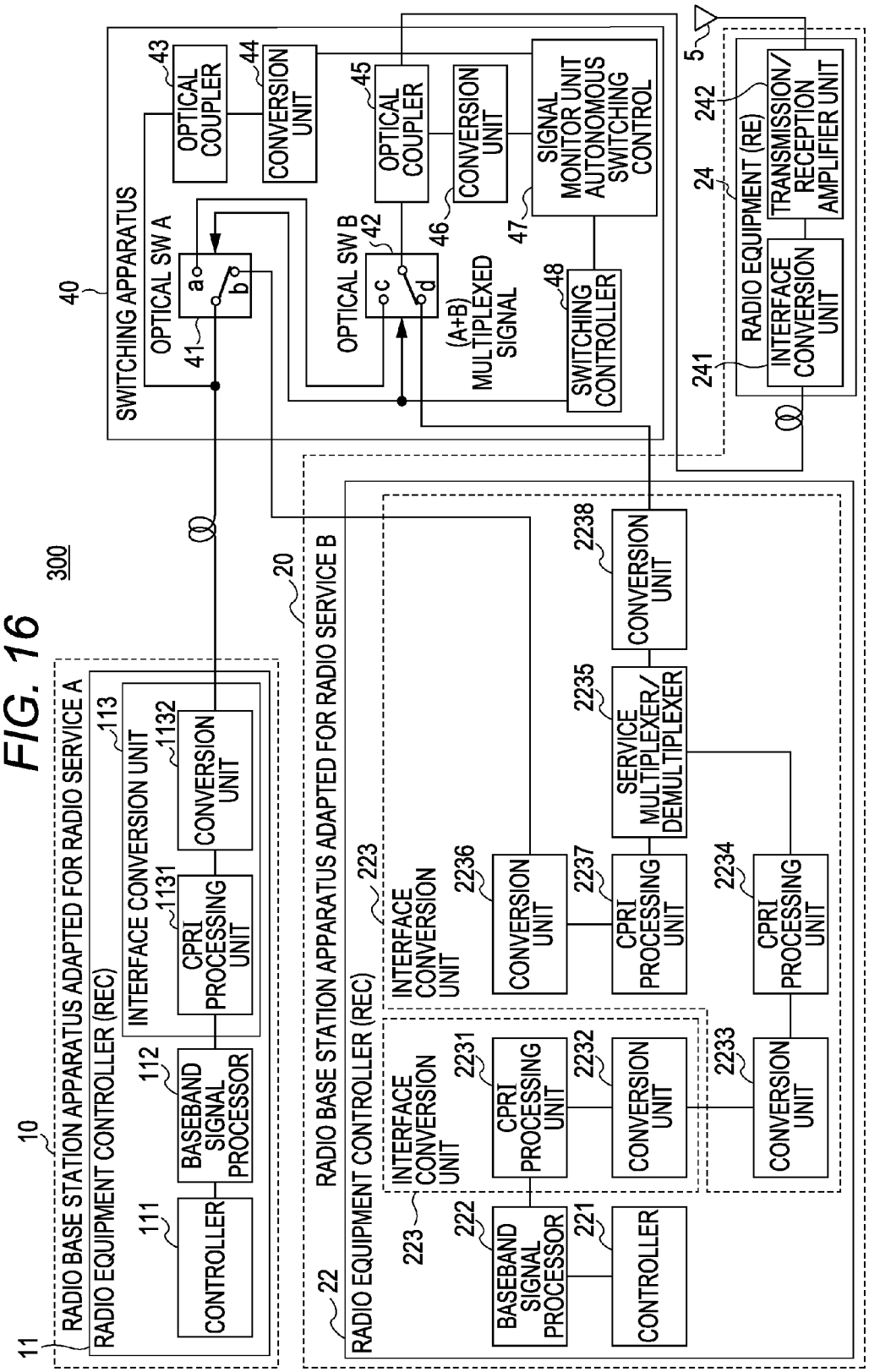
FIG. 16 illustrates yet another configuration example of a radio communication system.
Figure 17:
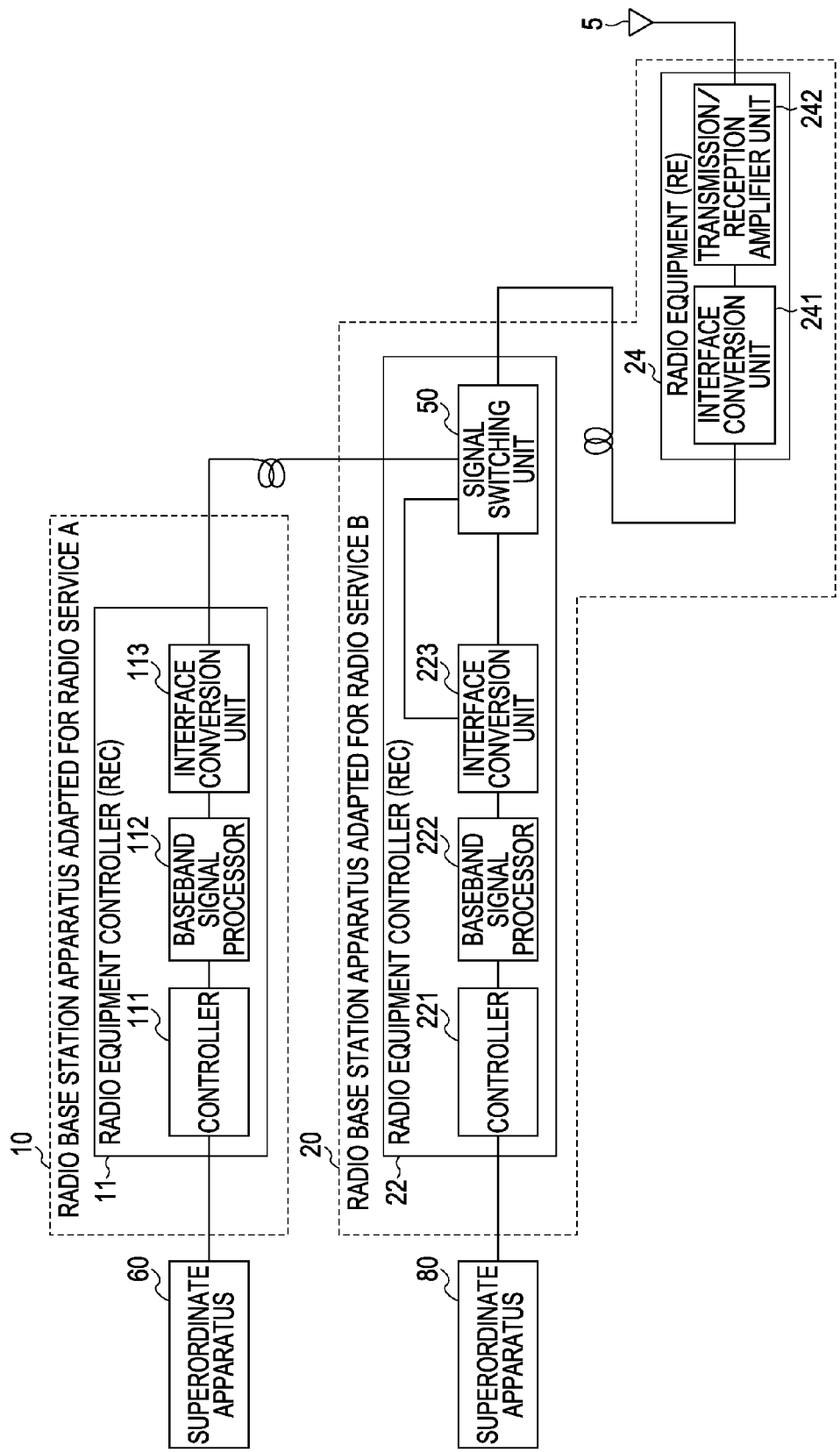
FIG. 17 illustrates yet another configuration example of a radio communication system.
Figure 18:
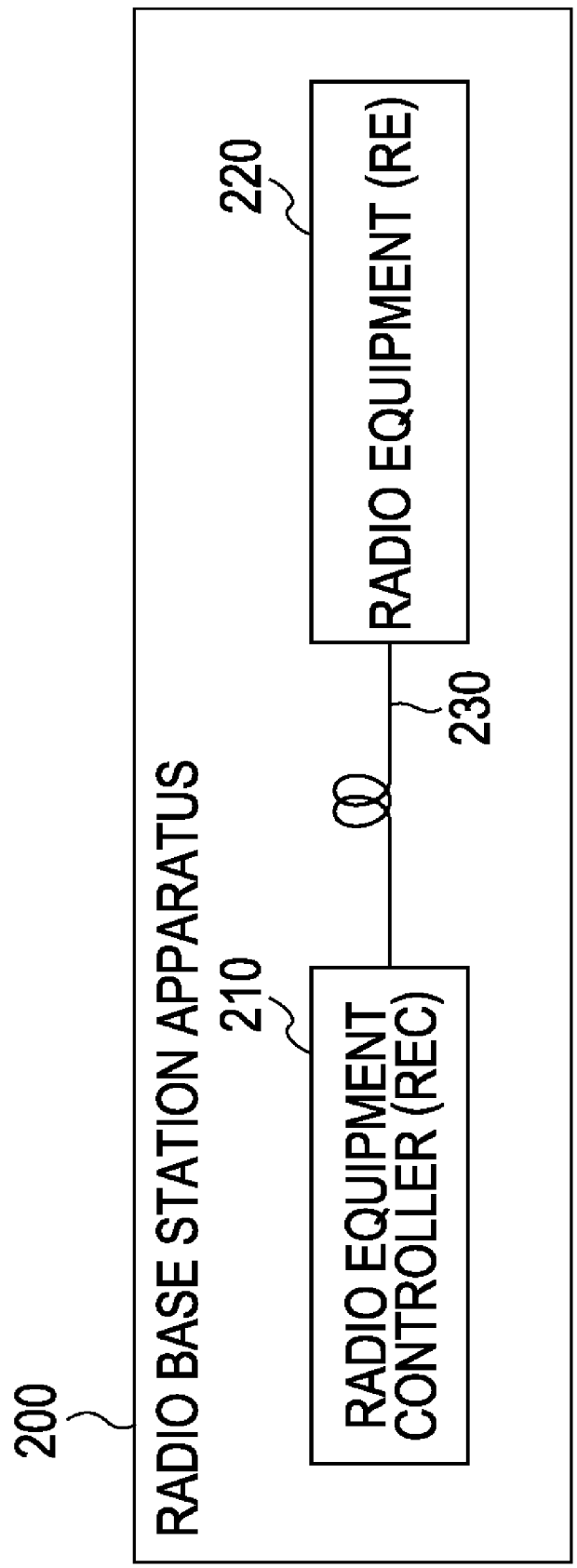
FIG. 18 illustrates a configuration example of a radio base station apparatus of related art.
Figure 19:
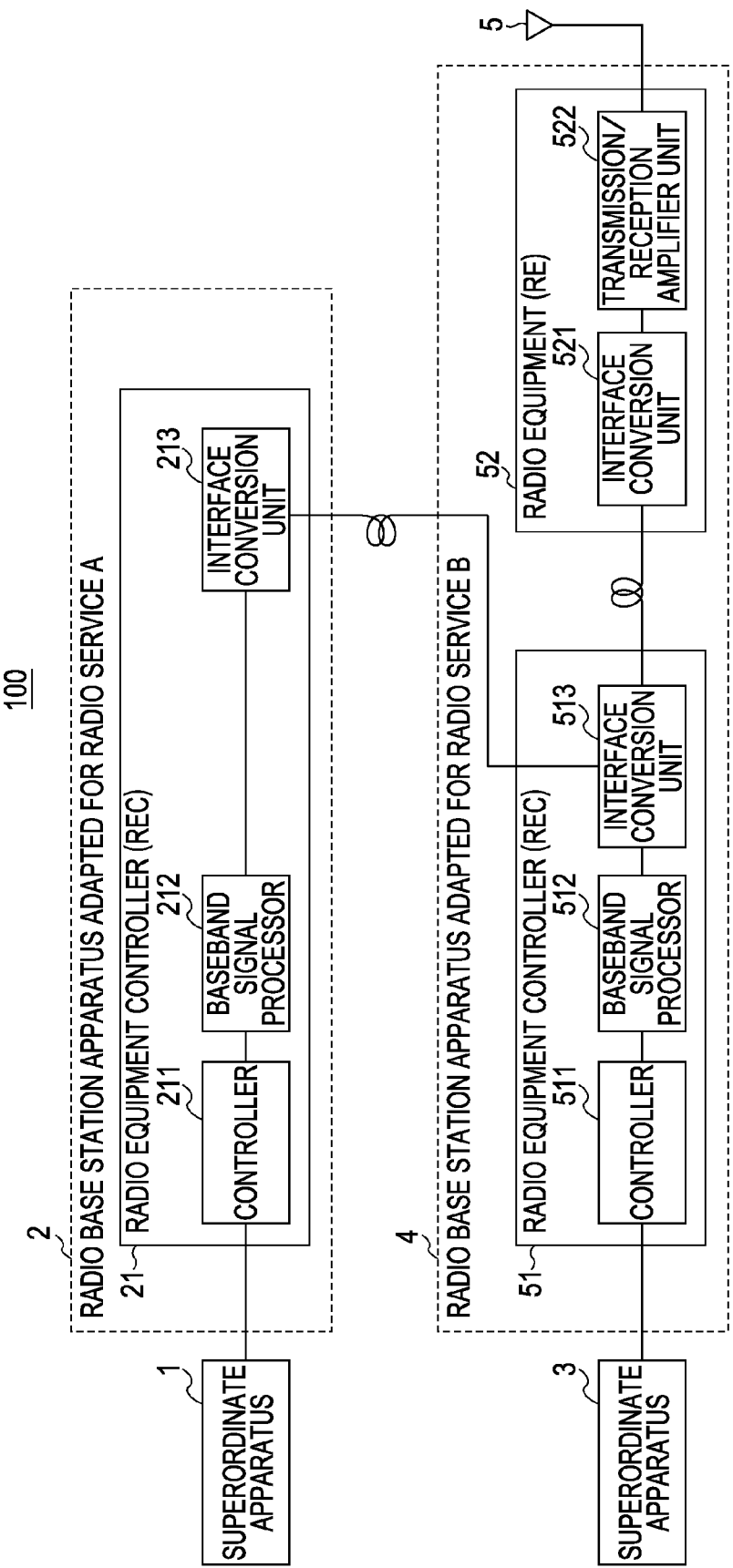
FIG. 19 illustrates a configuration example of a radio communication system of related art.

As a further embodiment, the radio equipment 24 may be arranged inside the second radio base station apparatus 20. FIGS. 16 and 17 are diagrams illustrating an example of the configuration of such an example of the radio communication system 300. As illustrated in FIG. 16, the second radio base station apparatus 20 further includes the radio equipment 24. Also, as illustrated in FIG. 17, the second radio base station apparatus 20 may further include a signal switching unit 50 in addition to the radio equipment 24.

According to this embodiment, as described above, there are provided a radio communication system, a radio communication apparatus and a signal switching method for the radio communication system capable of providing the services continuously.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication system for conducting a radio communication with a terminal device, the radio communication system comprising:
   a first radio communication apparatus configured to process a first signal;
   a second radio communication apparatus configured to process a second signal, and to combine the first signal from the first radio communication apparatus and the second signal;
   a common amplifier configured to amplify the first and second signals from the second radio communication apparatus, and to transmit the amplified signals to the terminal device; and
   a switching apparatus coupled to the first radio communication apparatus and the second radio communication apparatus and the common amplifier to disconnect the first or second radio communication apparatus when a fault occurs in the first or second radio communication apparatus.

2. The radio communication system according to claim 1, wherein the common amplifier is further configured to amplify first and second signals received from the terminal device, and to output the amplified signals from the terminal device to the second radio communication apparatus, and the second radio communication apparatus is configured to separate the amplified first and second signals.

3. The radio communication system according to claim 2, wherein the switching apparatus includes first and second switching units, and
upon occurrence of a fault in the second radio communication apparatus, the second switching unit operates in such a manner that the first and second signals output from the common amplifier are output to the first switching unit, and the first switching unit operates in such a manner that the first and second signals output from the first switching unit are output to the first radio communication apparatus thereby disconnecting the second radio communication apparatus.

4. The radio communication system according to claim 2, wherein the switching apparatus includes first and second switching units, and
upon occurrence of a fault in the first radio communication apparatus, the second switching unit operates in such a manner that the first and second signals output from the common amplifier are output to the second radio communication apparatus, and the first switching unit operates in such a manner as to be connected to the second switching unit.

5. The radio communication system according to claim 4, wherein the switching apparatus detects a fault in the first radio communication apparatus by receiving, from the first radio communication apparatus, a signal indicating that a fault has occurred in the first radio communication apparatus.

6. The radio communication system according to claim 1, wherein the switching apparatus includes first and second switching units, and
upon occurrence of a fault in the second radio communication apparatus, the first switching unit operates in such a manner that the first signal output from the first radio communication apparatus is output to the second switching unit, and the second switching unit operates in such a manner that the first signal output from the first switching unit is output to the common amplifier, thereby disconnecting the second radio communication apparatus.

7. The radio communication system according to claim 1, wherein the switching apparatus includes first and second switching units, and
upon occurrence of a fault in the first radio communication apparatus, the first switching unit operates in such a manner that the first signal output from the first radio communication apparatus is not combined with the second signal, and the second switching unit operates in such a manner that the second signal output from the second radio communication apparatus is output to the common amplifier.

8. The radio communication system according to claim 1, wherein the switching apparatus includes a detection unit for detecting a fault of the signal input to or output from the first radio communication apparatus and the switching apparatus and the signal input to or output from the switching apparatus and the radio equipment, and detecting, by the detection unit, the fault of the first or second radio communication apparatus.

9. The radio communication system according to claim 1, further comprising
a first superordinate apparatus connected to the first radio communication apparatus and a second superordinate apparatus connected to the second radio communication apparatus,
wherein the switching apparatus, based on a command from the first or second superordinate apparatus, operates in such a manner as to disconnect the first or second radio communication apparatus, respectively.

10. The radio communication system according to claim 1, wherein the switching apparatus is arranged in the second radio communication apparatus.

11. The radio communication system according to claim 1, wherein the second radio communication apparatus includes a radio controller for processing the second signal and an interface conversion unit for combining or separating the first and second signals, and the interface conversion unit is connected to the switching apparatus.

12. The radio communication system according to claim 11, wherein the interface conversion unit is arranged in the switching apparatus.

13. The radio communication system according to claim 1, wherein the first signal corresponds to a first communication method, and the second signal to a second communication method.

14. A radio communication apparatus for conducting a radio communication with a terminal device, the radio communication apparatus comprising:
a radio controller for combining a first signal with a second signal output from another radio communication apparatus;
a common amplifier for amplifying and transmitting to the terminal device the first and second signals output from the radio controller; and
a switching unit coupled to the other radio communication apparatus and the radio controller and the common amplifier to disconnect the other radio base station apparatus or the radio controller when a fault occurs in the other radio base station apparatus or the radio controller.

15. The radio communication apparatus of claim 14, wherein the common amplifier amplifies and outputs to the radio controller first and second signals received from the terminal device, and the radio controller separates the first and second signals received from the common amplifier.

16. A signal switching method for a radio communication system including a first radio communication apparatus for processing a first signal, a second radio communication apparatus for processing a second signal and to combine the first and second signals or separate first and second signals received from a common amplifier, and the common amplifier amplifying and transmitting to a terminal device the first and second signals output from the second radio communication apparatus and amplifying and outputting to the second radio communication apparatus the first and second signals received from the terminal device, the signal switching method comprising:
disconnecting, by a switching apparatus coupled to the first communication apparatus and the second radio communication apparatuses and the common amplifier, the first or second radio communication apparatus when a fault occurs in the first or second radio communication apparatus.

* * * * *